United States Patent [19]
Davis

[11] 3,760,945
[45] Sept. 25, 1973

[54] PRESSURE FILTER
[75] Inventor: Steven S. Davis, Bountiful, Utah
[73] Assignee: Envirotech Corporation, Salt Lake City, Utah
[22] Filed: Oct. 12, 1971
[21] Appl. No.: 188,355

[52] U.S. Cl. .................. 210/143, 100/198, 210/225
[51] Int. Cl. ...................... B01d 29/00, B01d 25/32
[58] Field of Search ...................... 210/91, 143, 227, 210/228, 229, 277, 297, 324, 330, 387, 400; 100/198, 115

[56] References Cited
UNITED STATES PATENTS
2,867,326  1/1959  Hirs ................................ 210/387 X
1,818,990  8/1931  Hanel ................................ 100/198
3,335,862  8/1967  Hirs ................................ 210/400
2,969,148  1/1961  Hirs ................................ 210/387 X FOREIGN PATENTS OR APPLICATIONS
1,080,461  8/1967  Great Britain ..................... 100/198

Primary Examiner—Samih N. Zaharna
Assistant Examiner—T. A. Granger
Attorney—Robert E. Krebs et al.

[57] ABSTRACT

An endless web filter medium zig-zags through a stack of superposed, spaced-apart, stationary filter press units mounted in a frame. Each press unit includes a stationary upper section which receives a reciprocatory ring; the ring carries a flexible diaphragm fixed to its periphery thereby forming a first chamber between the diaphragm and the upper section. The web may be supported by a drainage grid formed on the stationary section of the unit below. Actuating means extend the ring downwardly to contact the web below to form a filtration chamber overlying the web. Slurry is introduced and contained in the filtration chamber overlying the web. Slurry is introduced and contained in the filtration chamber overlying the web. Fluid pressure is introduced into the first chamber to exert force against the diaphragm to press liquid from the slurry in the filtration chamber through the web while forming a cake of solids thereon. Then, the fluid pressure may be released while the actuating means retracts the ring, and the web carries the cake from the press units to a remote discharge.

9 Claims, 6 Drawing Figures

PATENTED SEP 25 1973

INVENTOR.
STEVEN S. DAVIS

BY Robert Krebs

HIS ATTORNEY

PRESSURE FILTER

DISCUSSION OF PRIOR ART

Filter presses are a well-known means for batch formation of relatively dry cakes of solids. In one improvement, the presses are vertically stacked as units with the filter belt zig-zagged therebetween; the top surfaces of the units serve as drainage grids for the units above. However, known superposed units involve rather complex accordian-like mechanical movements with the requirement that some elements travel much further than others and equalization of sealing pressure is difficult. Other known superposed presses require the slurry to be fed under pressure.

OBJECTS OF THE INVENTION

An important object of the invention is to provide an improved cyclic filter with superposed presses having simplified mechanical movements;

Another object is to provide a cyclic filter with superposed presses mounted stationarily on a frame;

Yet another object is to provide a press for compressing cake on a filter medium by means of a fluid actuated diaphragm;

A further object is to provide a cyclic filter with superposed filtration units mounted stationarily on a frame wherein the filter compartments are formed by extensions of reciprocable elements from one unit into contact with an adjacent unit and, after completion of the cycle the resulting cake is released by retraction of said reciprocable element;

A yet further object is to provide a cyclic filter with superposed filtration units wherein each of the units is adapted to independent operation so that a blockage of feed to one of the units will not cause damage to the filter during a pressing operation; and A still further object is to provide a press with improved feed means to the filtration chamber.

BRIEF DESCRIPTION OF THE DRAWINGS

Further objects of the invention may be readily ascertained from the following description and illustrations, in which.

DETAILED DESCRIPTION OF THE INVENTION

Figure 1:
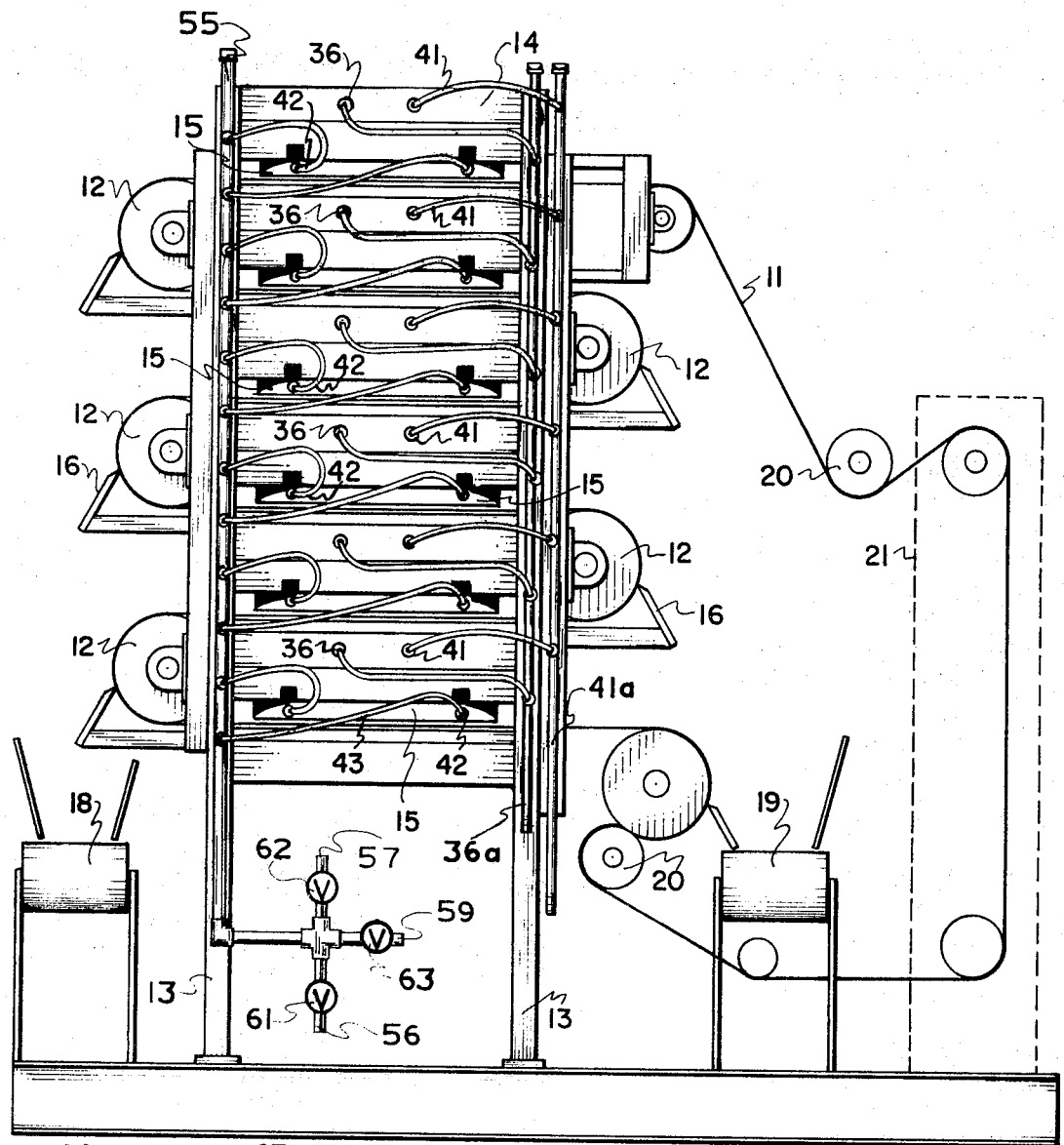
FIG. 1 is a schematic elevation of a cyclic filter having superposed filtration units embodying the invention.
Figure 2:
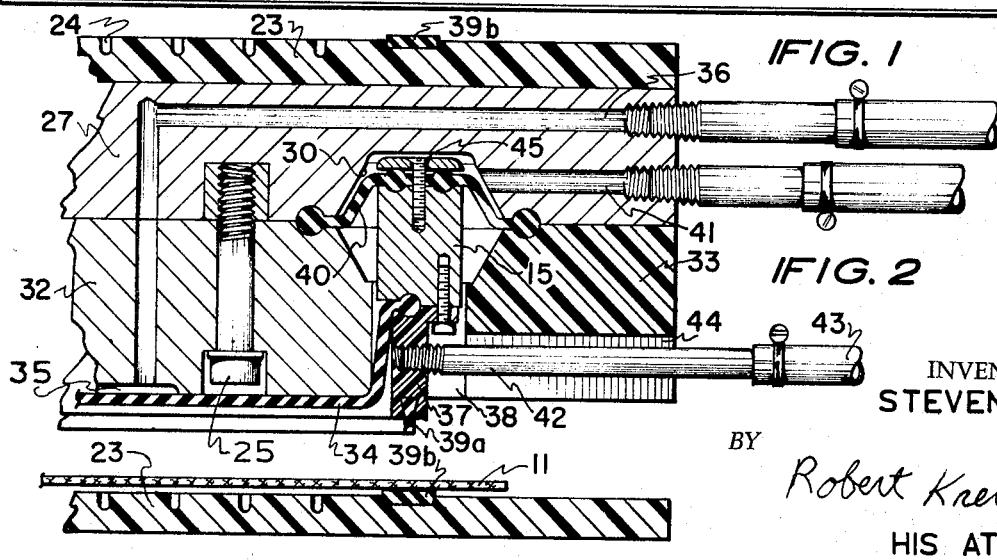
FIG. 2 is a detail, also in elevation, of one of the filtration units of FIG. 1 partially in section; taken in planes of lines 2—2 of FIG. 3 and looking in the direction of the arrows 2.
Figure 3:
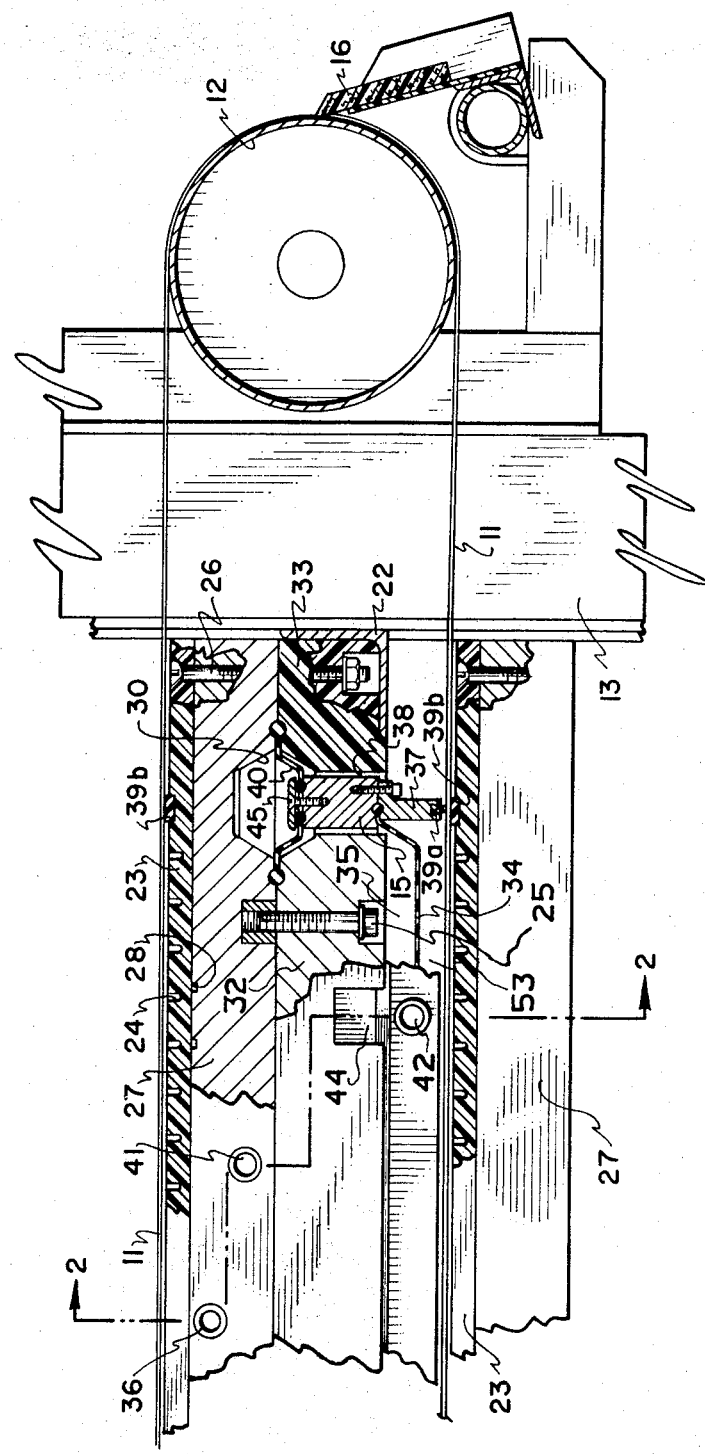
FIG. 3 is a fragmentary view, partly in section, of one end of two superposed units illustrating details of construction.
Figure 4:
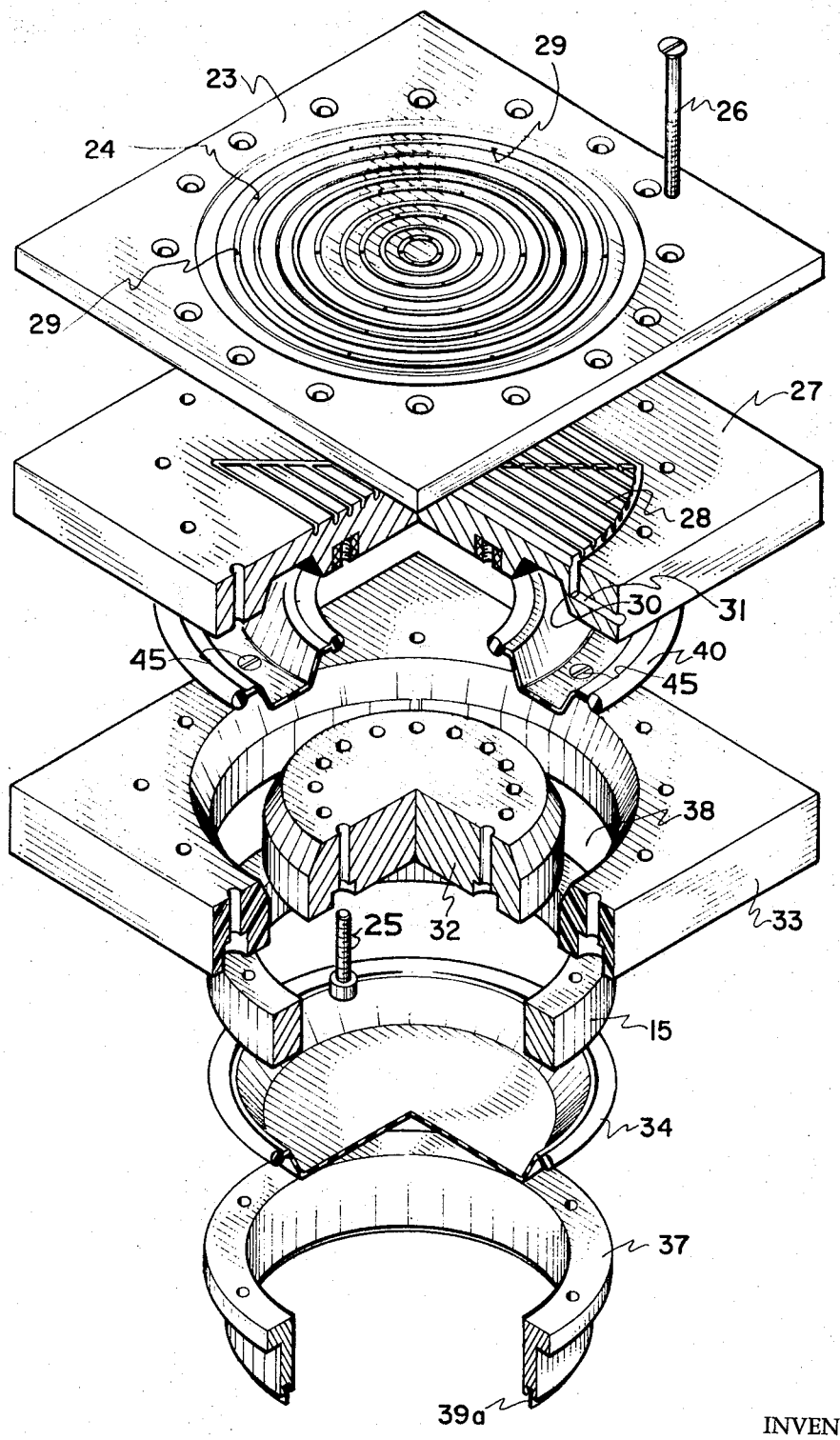
FIG. 4 is an exploded view of a complete one of the filtration units of FIGS. 1 and 3 viewed from above.
Figure 5:
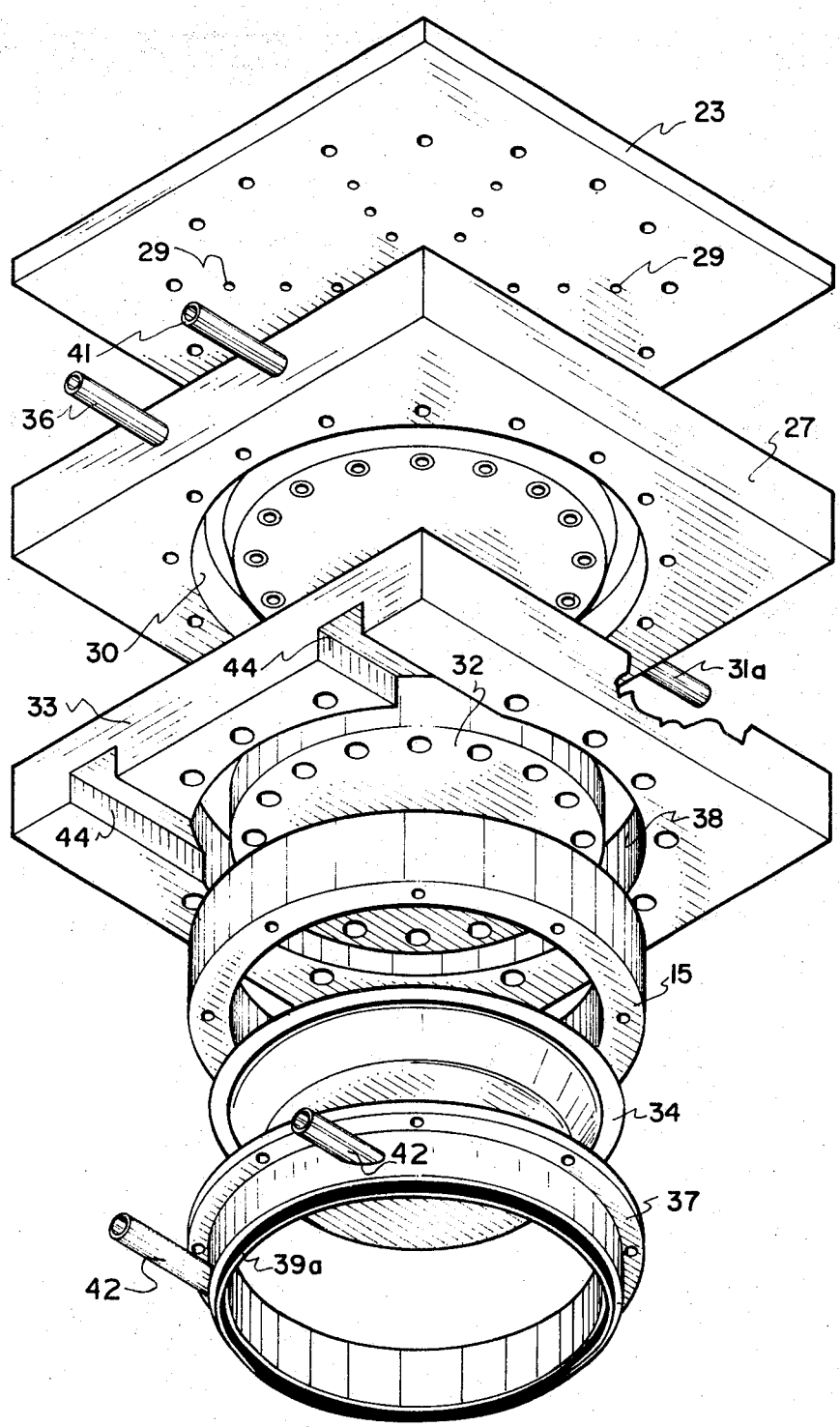
FIG. 5 is another exploded view of one of the filtration units similar to FIG. 4, but viewed from below.

As shown in FIG. 1, an endless web of filter medium 11 is trained around rollers 12 to zig-zag through a vertical frame 13 which supports the rollers and stationarily mounts superposed filter presses generally designated 14. Associated with each filter press is a reciprocatory designated generally designate 15, which seats down upon the web in the pressing action and which is raised from the web after a cake is formed and pressed thereon. With rings 15 raised, the web is driven in the direction indicated by the arrows so that knives 16, extending from the frame, scrape the cake from the passing web. The cake is deflected by the knives to drop onto conveyors 18 and 19 at opposite sides of the frame and the conveyors carry the cake to remote discharge. The web may be spray washed or otherwise cleaned in a housing 21 to which it is directed by auxiliary rollers 20.

Each press (FIGS. 2-5) has a stationary section which includes an upper plate 23, a middle plate 27 and two coplanar bottom plates 32 and 33, all of which are fixed together and set in a frame 13 on angle pieces 22. Each plate may be of milled metal construction or molded from heavy-duty plastic or similar materials. The top plate 23 is a drainage grid and has a pattern of drainage grooves 24 formed in its upper surface and a plurality of apertures 29 running from the bottom of the grooves 24 through the plate 23. The middle plate 27 has channels 28 formed in its upper surfaces and an annular channel 30 formed in its lower face. When the upper plate 23 is clamped (as by bolts 26) to the middle plate, the channels 28 are covered but are in communication with the drainage grooves 24 via the apertures 29. An outlet 31 is formed in the middle plate 27 to connect to the channels 28 to drain filtrate therefrom. The outlets 31 may connect, via pipes 31a, to a common drainage pipe (not shown) mounted on one of the vertical members of the frame 13.

The coplanar bottom plates 32 and 33 are, respectively, the circular plate 32 and the surrounding plate 33 which has an enlarged central aperture into which circular plate 32 is set to define an annular slot 38 therebetween; the plates 32 and 33 are both fastened to the middle plate 27 (as by bolts 25 and 26). The annular slot 38 registers with the open annular channel 30 formed in the bottom face of the middle plate 27 and the edges of the bottom plates adjacent the annular channel 30 may be beveled as shown.

The reciprocatory ring 15 is fitted into the annular space 38 and the concentric plates 32 and 33 provide cylinder walls along which the ring 15 reciprocates in a piston-like manner. In its retracted position in the illustrated embodiment, ring 15 enters annular channel 30. The ring is rigid and may be formed from various metals or plastics to resist corrosion. A circular diaphragm 34 is fixed at its peripheral edge to the ring 15 to form therewith a chamber 35 between the diaphragm and the stationary section above. The diaphragm is a non-foraminous, pliable material as is used in diaphragms in similar processes. An inlet, generally designated 36, is provided to the chamber 35 for supplying pressured fluid such as air thereinto; and each inlet may be served by a manifold 36a conveniently mounted as one of the vertical members of the frame 13. The fluid, from a remote source, not shown, is fed through the main pipe thence to the inlets to force the diaphragm downwardly at selected times. In the illustrated embodiment, the reciprocatory ring 15 is comprised of an upper ring and a lower circular flange member 37 fixedly depending therefrom; the abutting surfaces of the ring and the flange conveniently clamp the edge of the circular diaphragm. Obviously, the ring may be one piece and other arrangements may be made for retaining the diaphragm.

According to the invention, ring 15 is movable downward so that the flange 37 clamps the web 11 against the drainage grid plate 23a of the unit below to form a closed filtration chamber 53 (FIG. 3) between that grid and the diaphragm, the ring forming the endless wall enclosing the chamber. Opposed circular seals 39a and 39b are provided on the ring flange 37 and the upper plate 23 of the press unit below, respectively, to form a resilient seal over the web when the ring is in the extended position as in FIG. 3. Also, according to the invention, the ring is retractable. Reciprocation of the ring between the extended and retracted positions is effected by fluid pressure in annular channel 30, accordingly the annular channel 30 has an inlet 41 for connection to a source of pressured fluid (not shown). The inlets 41 for each of the units may be fed by another manifold 41a mounted along a vertical member of frame 11. A positive pressure differential in the channel forces the ring downward, while a negative pressure differential will retract the ring into the channel. The reciprocation is improved by providing an annular diaphragm 40 medially fixed to the top of the ring 15 (as by screws 45) with the peripheries of the diaphragm 40 clamped to the wall of the annular channel. Not only does the annular diaphragm provide an increased area over which the pressure acts, but the diaphragm also seals the channel 30 from leakage which might otherwise occur along the sides of the ring.

One or more feed inlets 42 communicate through the wall of ring 15 (more particularly, through circular flange 37) to the chamber which is formed below the circular diaphragm 39; flexible hoses 43 or the like connect the inlets to a manifold 55, thence to a source of feed, not shown. Two or more inlets may be spaced around the flange of the ring to achieve a more rapid or balanced feed. The outer annular plates 33 are provided with notches 44 providing clearance for the hoses 43 when the rings 15 are retracted. The manifold 55 may selectively conduct air and/or water to the inlets 42 in addition to the liquid feeds according to the steps selected in the filtration cycle. To provide for such selected flow, a three-way junction is formed at the inlet end of manifold 55 where the pipes entering the junction are, respectively, feed pipe 56, water pipe 57, and air pipe 58. Each of the pipes (56, 57 and 58) is equipped with a conventional check-valve (61, 62 and 63, respectively) to selectively allow flow therepast but to prevent back flow from the manifold 55.

Figure 6:
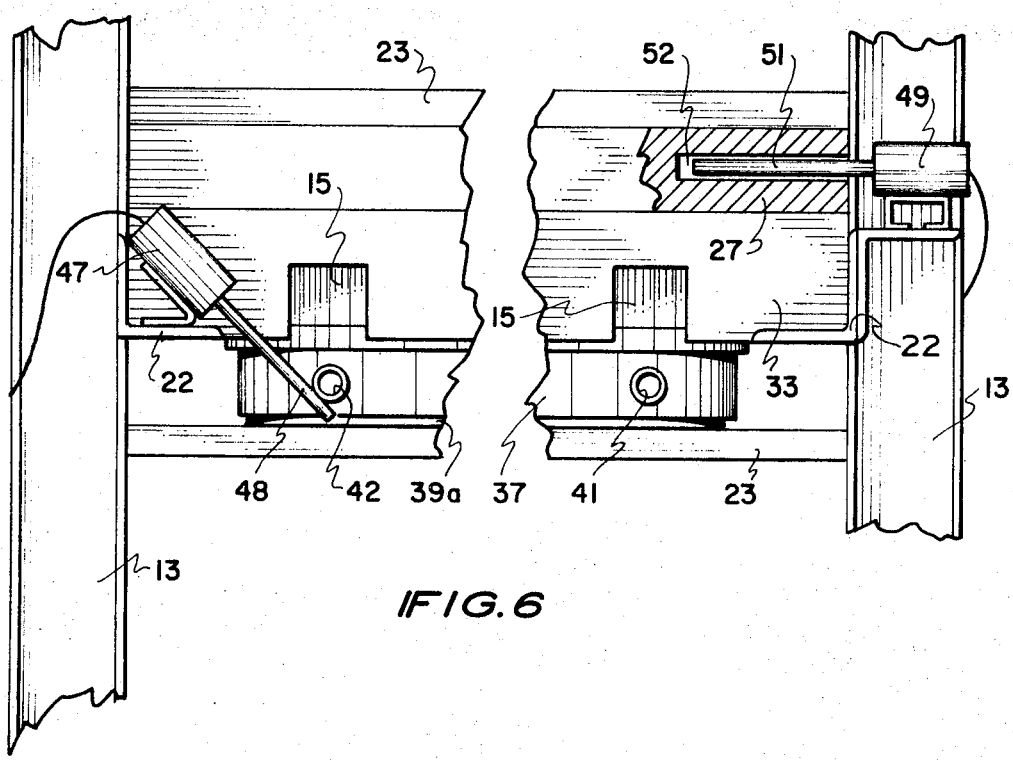
FIG. 6 is a partial side elevation of a filtration unit embodying a special modification of the invention employing safety devices to prevent damage to the unit, certain parts being cut away for clarity.

Safety devices are conveniently incorporated into the described embodiment of the press unit. As shown in FIG. 6, one of the safety devices comprises a limit switch 47 mounted on the frame 13 adjacent the ring 15 and positioned so that its arm 48 is tripped by the feed inlet 42 on the ring's flange 37. The limit switch may serve a dual function: the first to signal that the ring is down and the filter chamber formed so that feed may be fed thereinto and, secondly, that filtration and dewatering cycle is complete and the ring is raised so that the web may be moved. A second limit switch 49 is also mounted on a frame member 13. The arm 51 of this limit switch 49, however, projects into a recess 52 formed in one of the stationary plates. If feed to one of the press units is blocked, pressure on that unit generated by the adjacent presses during the pressing operation may buckle or break the plates. The function of limit switch 49 is to sense unusual deflection of the stationary plates such as would occur prior to buckling.

According to the invention, each of the press units can operate independently of all others. Hence, if desired the unit may be made of sufficiently strong materials that buckling is not a problem and elaborate safety valves may not be required. Also with such a strong construction it is possible, with proper valving, to operate only some of the press units during periods of reduced feed. This will permit keeping the filter on stream during reduced flows and this is often an economic advantage since it obviates the need for complete shutdown and startup.

One cycle in the operation of the press comprises first extending ring 15 downwardly to form a closed filtration chamber overlying the filter web 11. The ring extension is effected by feeding pressured fluid into annular channel 30 via inlet 41; the pressure acts on annular diaphragm 40 to press the ring 15 downward. That fluid pressure should be maintained during the entire of the filtration and pressing cycle. Next, feed under pressure (a liquid containing suspended solids) is fed from pipe 56 past valve 61 and through manifold 55 into the chamber 53 until a cake of preselected characteristics is formed. This may be measured on a time cycle or by buildup of back pressure to a selected level. Back flow of feed being prevented by the check valve 61. After the cake is formed, feed is stopped. Pressured air is supplied from pipe 58 past valve 63 and through the manifold 55 to the filtration chamber to displace filtrate. Water may be introduced from pipe 57 past valve 62 and through the manifold 55 to the filtration chamber to effect one or more washes. One or more water washes may be effected followed by further air. Filtrate passes through the filter medium into grooves 24, then flows through apertures 29 to drainage channels 28 whence it flows through outlet 31 to discharge.

To effect final dewatering of the cake, pressured fluid is admitted via inlets 42 into chamber 35 above the circular diaphragm 34 to press the diaphragm down onto the cake and compact it against the web to force liquid therefrom. Subsequent to those operations, the pressure on the annular diaphragm 40 is released and a negative pressure differential is introduced into channel 30 to lift the ring 15 from the web. It should be appreciated that ring 15 may be lifted well into the stationary plates so that the bottom of the ring is at least flush with the plates to provide maximum clearance between the plates and the formed cake. Finally, the web 11 may be actuated to move until the cake is discharged as previously described. The cycle may then be repeated.

I claim:

1. A filter apparatus comprising:
   A. A rigid structural frame;
   B. A plurality of vertically arranged filter presses mounted on said frame and an endless belt of filter medium supported by said frame and trained to pass in zig-zag fashion from one press to the next, each of said presses comprising:
      1. An impervious first plate horizontally fixed to said frame;
      2. A second plate horizontally fixed to said frame and spaced apart from said first plate in face-to-face relation thereto, thereby defining an open space therebetween; the surface of said second plate facing said first plate having ports formed therein which communicate with outlet means for filtrate;
3. Means mounted on said frame adjacent said second plates whereby sections of said filter medium belt may be indexed across said surface of said second plate;
4. An endless wall which sealingly engages said first plate and which encompasses a substantial portion of that surface of said first plate which faces said second plate;
5. Means connected to said endless wall to selectively move said wall toward and away from said surface of said second plate;
6. A flexible diaphragm sealingly connected to the periphery of said endless wall defining a fluid pressure chamber between said diaphragm, said endless wall and said surface of said first plate;
7. Inlet means for introducing fluid under pressure into said first fluid pressure chamber;
8. A liquid-filtering chamber defined by said endless wall when the same is moved toward said surface of said second plate whereby the lower peripheral edge of said endless wall sealingly engages a section of filter medium arranged on the surface of said second plates, said ports in the surface of said second plate being beneath the engaged section of filter medium, said endless wall defining the sidewall of said liquid-filtering chamber and said diaphragm defining a wall opposite said second plate which closes said liquid-filtering chamber; and
9. Feed inlet means in said endless wall wherethrough fluid to be filtered is introduced into said liquid-filtering chamber while said endless wall is in position against said second plate;

whereby solids are separated from the feed liquid by (1) the introduction of solids-bearing liquid feed into said liquid-filtering chamber thereby to express filtrate through the filter medium to discharge from said outlets concomittantly with the formation of a filter cake thereon, (2) said solids are further dried by the introduction of pressured fluid into said fluid-pressure chamber to urge said flexible diaphragm toward said second plate pressing the cake thereagainst and solids are discharged from the filter by retraction of said endless wall followed by indexing of said filter belt to move the cake-laden portion from between said first and second plates to a point of discharge.

2. A filter apparatus according to claim 1 wherein said means permitting selective movement of said endless wall comprises:
   a. An annular diaphragm which is sealingly fixed concentrically about the periphery of said endless wall and which is also fixed to said first plate to support said endless wall therefrom; and
   b. Second inlet means in said first plate communicating with one side of said annular diaphragm to introduce fluid under pressure against said annular diaphragm thereby to selectively move said endless wall toward and away from said second plate.

3. A filter apparatus according to claim 1 wherein said means to selectively move said endless wall comprises a matching endless slot formed in said first plate for receiving said endless wall, and fluid inlet means communicate with said slot for introducing fluid under pressure thereto to act against the wall to move the same toward said second plate.

4. A filter apparatus according to claim 1 wherein each of said presses include means for sensing the position of said endless wall and control means associated with said means for indexing said filter medium, said control means being responsive to said sensing means to energize said indexing means only when said endless wall is retracted from said second plate.

5. A filter press according to claim 1, including valved conduit means cooperating with said feed means to seletively deliver air under pressure to said liquid-filtering chamber.

6. A filter press according to claim 5 further including valved conduit means cooperating with said feed means to selectively deliver wash fluid to said liquid-filtering chamber.

7. A filter apparatus according to claim 1 including valve means associated with said feed means to selectively block delivery of feed into said liquid-filtering chamber of at least one of said presses while maintaining feed to the other said presses.

8. A filter apparatus according to claim 1 including means for sensing the position of said endless wall, and control means associated with said feed means and responsive to said sensing means to enable delivery of feed only when said wall is in the extended position.

9. A filter press according to claim 1 further including means to sense abnormal displacement of said first plate and said second plate and control means associated with said feed means responsive to said sensing means to block operation of said feed means when said first plate and said second plate are abnormally displaced.

* * * * *